Oct. 5, 1971   W. A. WEMYSS   3,610,043
LIQUID FLOWMETERS AND MOTORS

Filed Sept. 24, 1969   2 Sheets-Sheet 1

INVENTOR
WILLIAM A. WEMYSS
BY
Smise + Smiley
Attys.

United States Patent Office 3,610,043
Patented Oct. 5, 1971

3,610,043
LIQUID FLOWMETERS AND MOTORS
William Alexander Wemyss, Harefield, England, assignor to B. Rhodes & Son Limited, Essex, England
Filed Sept. 24, 1969, Ser. No. 860,691
Claims priority, application Great Britain, Sept. 27, 1968, 45,994/68
Int. Cl. G01f 1/06
U.S. Cl. 73—229                                    9 Claims

ABSTRACT OF THE DISCLOSURE

This invention relates to a flowmeter for liquids having a rotor in a chamber, the rotor having radially extending vanes. There is a circumferential gap in the median plane of the vanes. The inlet to the chamber is tangentially directed and opens into the chamber at the greater radius of an involutely formed part at one side of the median plane whilst the outlet from the chamber leads from a similar evolutely formed part at the other side of the plane. A baffle is fixed in the casing and extends inwards so as to protrude into the gap and so to separate the involute and evolute parts of the chamber. Thus the liquid is compelled to pass from the inlet to the outlet through the channels between the vanes whilst flowing helically along the chamber.

---

This invention relates to liquid flowmeters of the kind in which a rotor is driven, and to miniature motors to be similarly driven by a liquid flow. As a flowmeter, the invention seeks to provide that there is good linearity of indication of rate of flow over a wide range of rates; that there is adequate output to operate whatever measuring indicator is required; that even at very low rates of flow there is minimal slip; and that the pressure drop through the flowmeter is kept low.

According to the invention a flowmeter for liquid measurement comprises a rotor having vanes extending radially from its rim whose tips lie in a surface of revolution coaxial with the rotational axis and the rotor being symmetrical to each side of a median plane normal to the rotational axis in which plane the vanes are interrupted; a casing containing the rotor in a chamber and supporting the rotor through sealed bearings, the chamber having towards one end a tangentially-directed inlet for the liquid and towards the other end an outlet for the liquid, the inlet opening into the chamber at the greater radius of an involutely formed part of the chamber disposed to one side of said plane and the outlet opening from a similar evolutely formed part disposed to the other side of the plane; a baffle fixed in the casing and extending radially inwards in the chamber so as to intrude into the interruptions and just clear the rim of the rotor through an arc so as to separate the involute and evolute parts of the chamber thus compelling the liquid to pass from the inlet to the outlet through the vane-channels whilst it flows helically along the chamber; and calibrated means for indicating the rotational speed of the rotor.

It will be understood that in this specification and claims the words involutely and evolutely are to be read with respect to the direction of rotation of the rotor.

The baffle is preferably constituted by an annular member which is fixed in the casing. That half of its inner circumference which lies between the inlet and the outlet may be concentric with reference to the rotor whilst the other half may be outwardly eccentric thereto.

For ease of manufacture, the casing may be made of two substantially identical halves. Preferred materials are stainless steel for the casing and glass filled nylon for the rotor, though other suitable materials may of course be used.

The preferred means for indicating the r.p.m. of the rotor is to provide a magnet carried by the rotor and so arranged as to co-operate with a reed switch mounted on the casing.

The invention will now be further described by way of example with reference to the accompanying drawings, in which.

Figure 3:
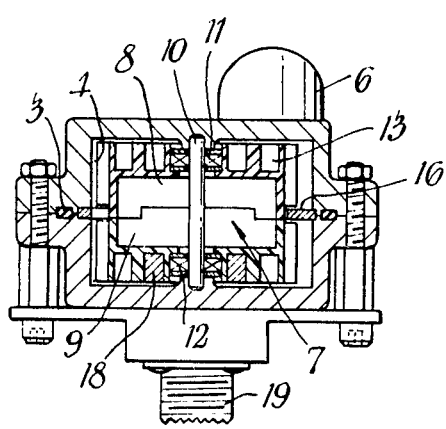
FIG. 3 is a sectional view of the assembled flow meter.
Figure 5:
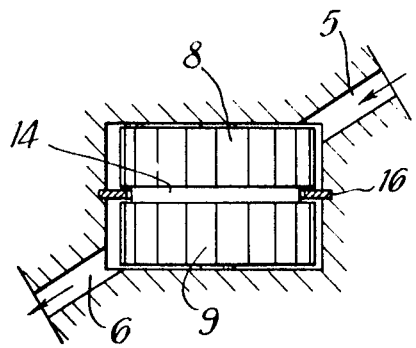

Referring to the drawings, a casing is comprised by two identical castings 1 and 2, such that when bolted together and sealed by an O-ring 3 they form a chamber 4. The casting 1 has a tangentially-directed inlet 5 for the liquid and the casting 2 has a corresponding outlet 6. The inlet 5 and the outlet 6 are arranged so as to be aligned, their common axis being both tangential to and helically inclined to the axis of a rotor generally indicated at 7. The rotor 7 is made up of two glass filled nylon mouldings 8 and 9 as seen in FIGS. 3 and 5, the mouldings together forming a cylindrical wheel borne on two bearings 11 and 12. These bearings are in turn borne by a spindle 10 which retains the assembly in the casing. The rotor 7 has labyrinths, as shown for example at 13, to prevent any liquid flow between the ends and the walls of the casing.

Figure 1:
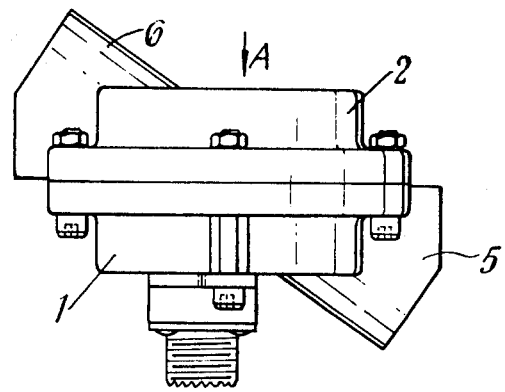
FIG. 1 is an external view of the casing.
Figure 2:
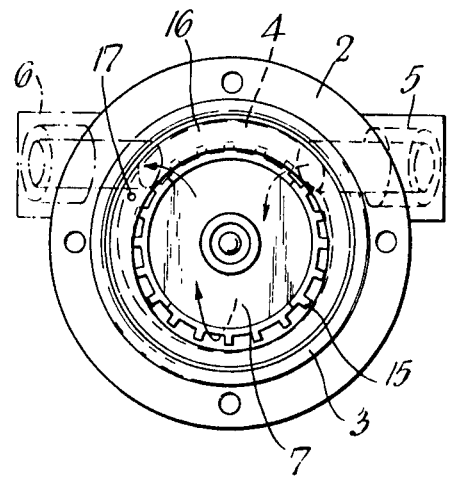
FIG. 2 is a part-sectional view taken in the direction of the arrow A in FIG. 1.
Figure 4:
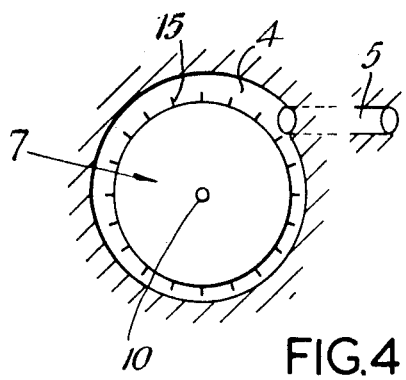
FIGS. 4 and 5 are diagrammatic views of details.

The two rotor mouldings 8 and 9 are interrupted by a gap 14 (FIG. 5) and vanes such as 15 (FIG. 2) extend radially from the rim of the rotor wheel so as to co-operate with the inner surface of the chamber 4. This inner surface is of involute form on one side of the rotor gap 14 and of evolute form on the other side. The inlet 5 opens into the chamber at the greater radius of the involute part (FIG. 4) whilst the outlet 6 similarly opens from the greater radius of the evolute part or in other words, regarding for example FIG. 4, it is emphasized that the housing wall disposed parallel to the rotor axis describes an involute surface with the arrangement of inlet/outlet being placed at the point of maximum radius.

A baffle 16 in the form of an annular ring is nipped between the castings 1 and 2 and extends radially inwards in the chamber 4. It is positively located on a pin 17 attached to one of the castings. That half of the inner circumference of the baffle 16 which lies between the inlet 5 and the outlet 6 is concentric to the axis of the rotor 7 and intrudes into the gap 14 so as just to clear the rim of the rotor wheel. The other half of the inner circumference is outwardly eccentric to the axis so as to clear the tips of the vanes of the rotor, such clearance, with reference to FIGS. 2 and 4, being a minimum at the sides increasing to a maximum at the bottom. The baffle thus separates the involute and evolute parts of the chamber 4. It can be seen that the liquid can only pass from the inlet 5 to the outlet 6 by flowing through the channels between the vanes 15 whilst at the same time flowing in a helical path along the chamber 4. This route is shown by the arrows in FIG. 2.

A circular magnet 18, polarised across its diameter, is embedded in the rotor moulding 9 and serves to actuate a reed switch 19 as the rotor revolves. The action of the reed switch in turn operates a meter (not shown) which is suitably calibrated so as to give a direct indication of the rate of flow of the liquid. The meter may also be calibrated to indicate the total integrated flow in a given time.

I claim:

1. A flowmeter for liquid measurement comprising a rotor, vanes extending from the rim of said rotor with their tips lying in a surface of revolution coaxial with the rotational axis of said rotor, said rotor being symmetrical to each side of a median plane normal to said rotational axis and having said vanes interrupted by a gap in said median plane, a casing containing said rotor in a chamber and supporting said rotor through bearings, a baffle fixed in said casing and extending radially inwards in said chamber so as to intrude into said gap and just to clear said rim of said rotor through an arc, said chamber having towards one end a tangentially directed inlet for the liquid, said inlet being located approximately on an extension of a radius drawn from the rotor center to the closest point of intrusion the baffle into the gap, and said chamber having towards the other end an outlet for said liquid, said inlet opening into said chamber at the point of greater radius of an involutely formed part of said chamber disposed to one side of said median plane and said outlet opening from said chamber at the point of greater radius of an evolutely formed part of said chamber disposed on the other side of said median plane, said baffle separating said involute part and said evolute part of said chamber thus compelling the liquid to pass from said inlet to said outlet through the channels between said vanes whilst flowing helically along said chamber, and calibrated means for indicating the rotational speed of said rotor.

2. A flowmeter as claimed in claim 1 in which said baffle is constituted by an annular member fixed in said casing with its inner circumference eccentric with reference to said rotor.

3. A flowmeter as claimed in claim 2 in which said inlet has an internal supply duct which is both tangentially and in helical sense with reference to said placed tangent to a cylinder larger than and concentric with the rotor and also at an acute angle to the median plane of the rotor.

4. A flowmeter as claimed in claim 3 in which said outlet has an internal delivery duct which is substantially coaxial with said supply duct.

5. A flowmeter as claimed in claim 4 in which said calibrated means comprises a magnet carried by said rotor and arranged for co-operation with a reed switch mounted on said casing.

6. A flowmeter according to claim 5 in which said casing comprises two substantially identical halves assembled symmetrically with their interface in said median plane.

7. A flowmeter according to claim 6 in which said rotor comprises two substantially identical halves adapted to be mounted on said bearings on a common spindle, said baffle being located between said halves during assembly.

8. A flowmeter according to claim 7 in which said rotor is provided on its ends with labyrinth means to obstruct liquid flow between the ends and the walls of said casing.

9. A flowmeter according to claim 8 in which said tips of said rotor vanes have minimal clearance from said casing when they proximate to the wall of said chamber at the minimum radii of its parts.

References Cited

UNITED STATES PATENTS 3,429,182    2/1969    Wemyss _____ 73—229

FOREIGN PATENTS 672,517    5/1952    Great Britain _____ 73—229
415,399    12/1924    Germany _____ 73—230

RICHARD C. QUEISSER, Primary Examiner

C. E. SNEE III, Assistant Examiner